US012184854B2

(12) United States Patent
Zhao et al.

(10) Patent No.: US 12,184,854 B2
(45) Date of Patent: Dec. 31, 2024

(54) MAXIMUM TRANSFORM SIZE CONTROL

(71) Applicant: TENCENT AMERICA LLC, Palo Alto, CA (US)

(72) Inventors: Xin Zhao, San Jose, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/184,224

(22) Filed: Mar. 15, 2023

(65) Prior Publication Data

US 2023/0224462 A1 Jul. 13, 2023

Related U.S. Application Data

(63) Continuation of application No. 17/468,929, filed on Sep. 8, 2021, now Pat. No. 11,647,192, which is a
(Continued)

(51) Int. Cl.
*H04N 19/122* (2014.01)
*H04N 19/169* (2014.01)
*H04N 19/18* (2014.01)
*H04N 19/44* (2014.01)
*H04N 19/70* (2014.01)

(52) U.S. Cl.
CPC ........... *H04N 19/122* (2014.11); *H04N 19/18* (2014.11); *H04N 19/188* (2014.11); *H04N 19/44* (2014.11); *H04N 19/70* (2014.11)

(58) Field of Classification Search
CPC .................................................. H04N 19/122
See application file for complete search history.

(56) References Cited

U.S. PATENT DOCUMENTS 9,300,974 B2 * 3/2016 Lee ...................... H04N 19/186
9,788,019 B2 * 10/2017 Liu ......................... H04N 19/70
(Continued)

FOREIGN PATENT DOCUMENTS

EP      2 950 542 A1      12/2015
JP     2017-208846 A      11/2017
(Continued)

OTHER PUBLICATIONS

Korean Office Action issued Aug. 28, 2023 in Application No. 10-2021-7017551.
(Continued)

*Primary Examiner* — Irfan Habib
(74) *Attorney, Agent, or Firm* — Sughrue Mion, PLLC

(57) ABSTRACT

A method and apparatus for performing maximum transform size control for encoding of a video sequence includes identifying, by an encoder, a high-level syntax element associated with the video sequence. A maximum transform size associated with the video sequence is determined based on identifying the high-level syntax element associated with the video sequence. The video sequence is encoded using the maximum transform size based on determining the maximum transform size associated with the video sequence. The video sequence is transmitted based on encoding the video sequence using the maximum transform size.

14 Claims, 6 Drawing Sheets

Related U.S. Application Data continuation of application No. 16/804,547, filed on Feb. 28, 2020, now Pat. No. 11,159,795.

(60) Provisional application No. 62/813,665, filed on Mar. 4, 2019.

(56) References Cited

U.S. PATENT DOCUMENTS

| | | | | |
|---|---|---|---|---|
| 9,912,944 | B2* | 3/2018 | Guo | H04N 19/96 |
| 10,021,394 | B2* | 7/2018 | Wang | H04N 19/152 |
| 10,779,007 | B2* | 9/2020 | Hsiang | H04N 19/176 |
| 10,798,376 | B2* | 10/2020 | Xu | H04N 19/70 |
| 10,798,382 | B2* | 10/2020 | Zhao | H04N 19/64 |
| 10,805,624 | B2* | 10/2020 | Xu | H04N 19/46 |
| 10,812,810 | B2* | 10/2020 | Ye | H04N 19/52 |
| 11,025,937 | B2* | 6/2021 | Zhao | H04N 19/61 |
| 11,032,543 | B2* | 6/2021 | Zhao | H04N 19/176 |
| 2012/0243614 | A1 | 9/2012 | Hong | H04N 19/52 375/E7.026 |
| 2013/0003824 | A1* | 1/2013 | Guo | H04N 19/46 375/240.18 |
| 2013/0251026 | A1* | 9/2013 | Guo | H04N 19/136 375/240.02 |
| 2013/0343464 | A1* | 12/2013 | Van der Auwera | H04N 19/60 375/240.18 |
| 2014/0219336 | A1 | 8/2014 | Jeon et al. | |
| 2014/0341275 | A1 | 11/2014 | Chen et al. | |
| 2016/0173906 | A1* | 6/2016 | Lei | H04N 19/176 375/240.13 |
| 2016/0219290 | A1* | 7/2016 | Zhao | H04N 19/167 |
| 2016/0330480 | A1* | 11/2016 | Liu | H04N 19/593 |
| 2017/0006309 | A1* | 1/2017 | Liu | H04N 19/597 |
| 2017/0142448 | A1* | 5/2017 | Karczewicz | H04N 19/91 |
| 2017/0150186 | A1* | 5/2017 | Zhang | H04N 19/61 |
| 2018/0278958 | A1* | 9/2018 | Hsiang | H04N 19/60 |
| 2019/0104322 | A1* | 4/2019 | Tsukuba | H04N 19/61 |
| 2020/0128249 | A1* | 4/2020 | Karczewicz | H04N 19/61 |
| 2020/0228832 | A1* | 7/2020 | Tsai | H04N 19/593 |
| 2020/0296370 | A1* | 9/2020 | Egilmez | H04N 19/593 |
| 2020/0296399 | A1* | 9/2020 | Zhao | H04N 19/70 |
| 2020/0314448 | A1* | 10/2020 | Zhao | H04N 19/184 |

FOREIGN PATENT DOCUMENTS

| | | |
|---|---|---|
| TW | 201841498 A | 11/2018 |
| WO | 2012/121420 A1 | 9/2012 |

OTHER PUBLICATIONS

International Search Report and Written Opinion in International Application No. PCT/US20/20607, issued on May 27, 2020.

Examination Report dated Jun. 16, 2022 from the Australian Intellectual Property Office in AU Application No. 2020233293.

Office Action issued Mar. 16, 2022 in Russian Application No. 2021127525.

Office Action issued Mar. 25, 2022 in Indian Application No. 202147039397.

Bross et al., "Versatile Video Coding (Draft 4)", Joint Video Experts Team (JVET) of ITU-T SG 16 WP 3 and ISO/IEC JTC 1/SC 29/WG 11, 13th Meeting, Marrakech, MA, Jan. 9-18, 2019, JVET-M1001-v5, 9 pages.

Communication dated May 31, 2022, issued in Japanese Application No. 2021-531981.

Yin Zhao et al., "CE6: Sub-block transform for inter blocks (CE6. 4.1)", Joint Video Experts Team (JVET) of ITU-T SG 16 WP 3 and ISO/IEC JTC 1/SC 29/WG 11, 13th Meeting, Marrakech, MA, Jan. 9-18, 2019, JVET-M0140-v3 (18 pages).

Communication dated May 13, 2024, issued in Korean Application No. 10-2021-7017551.

* cited by examiner

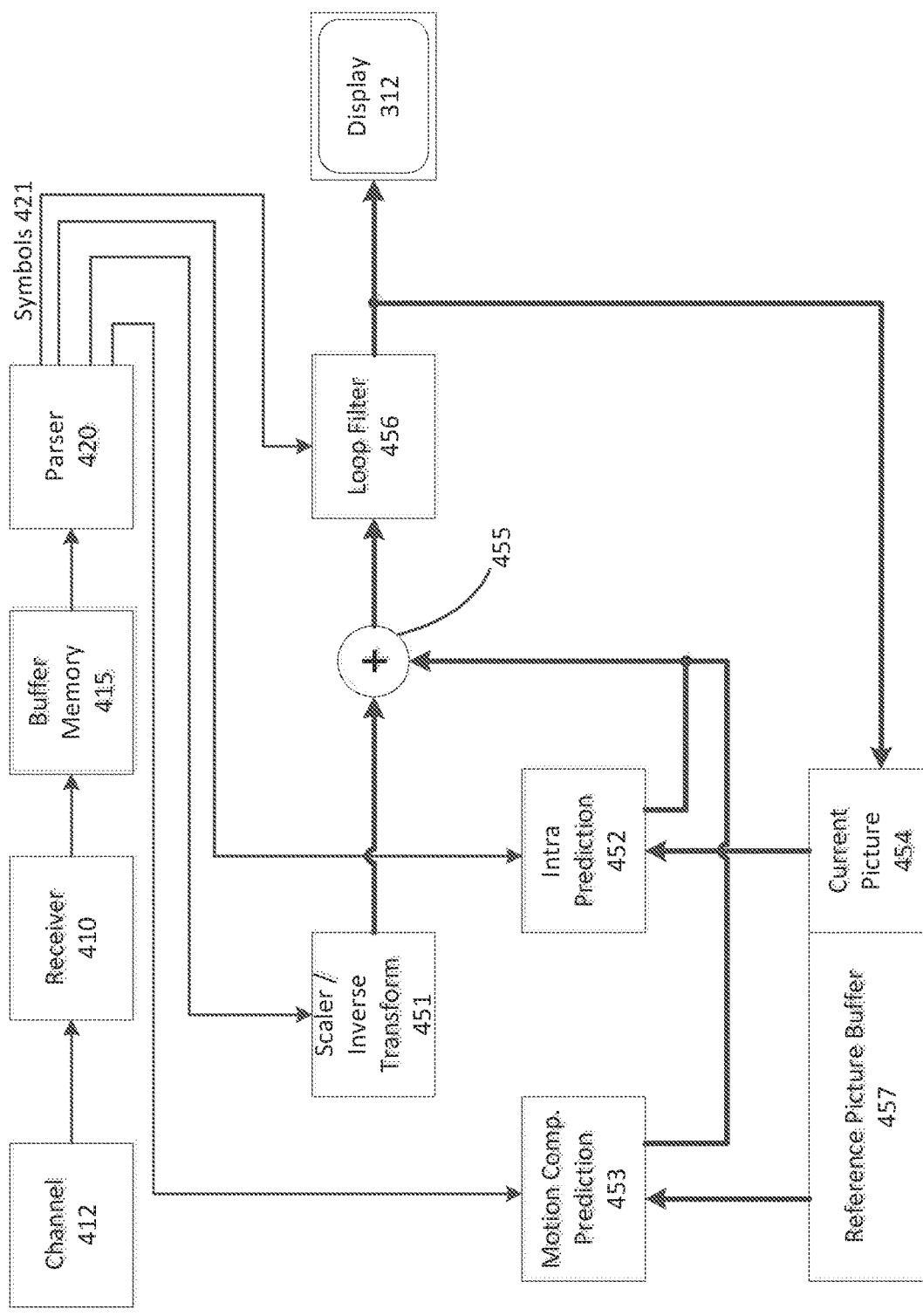
FIG. 4    Decoder 310

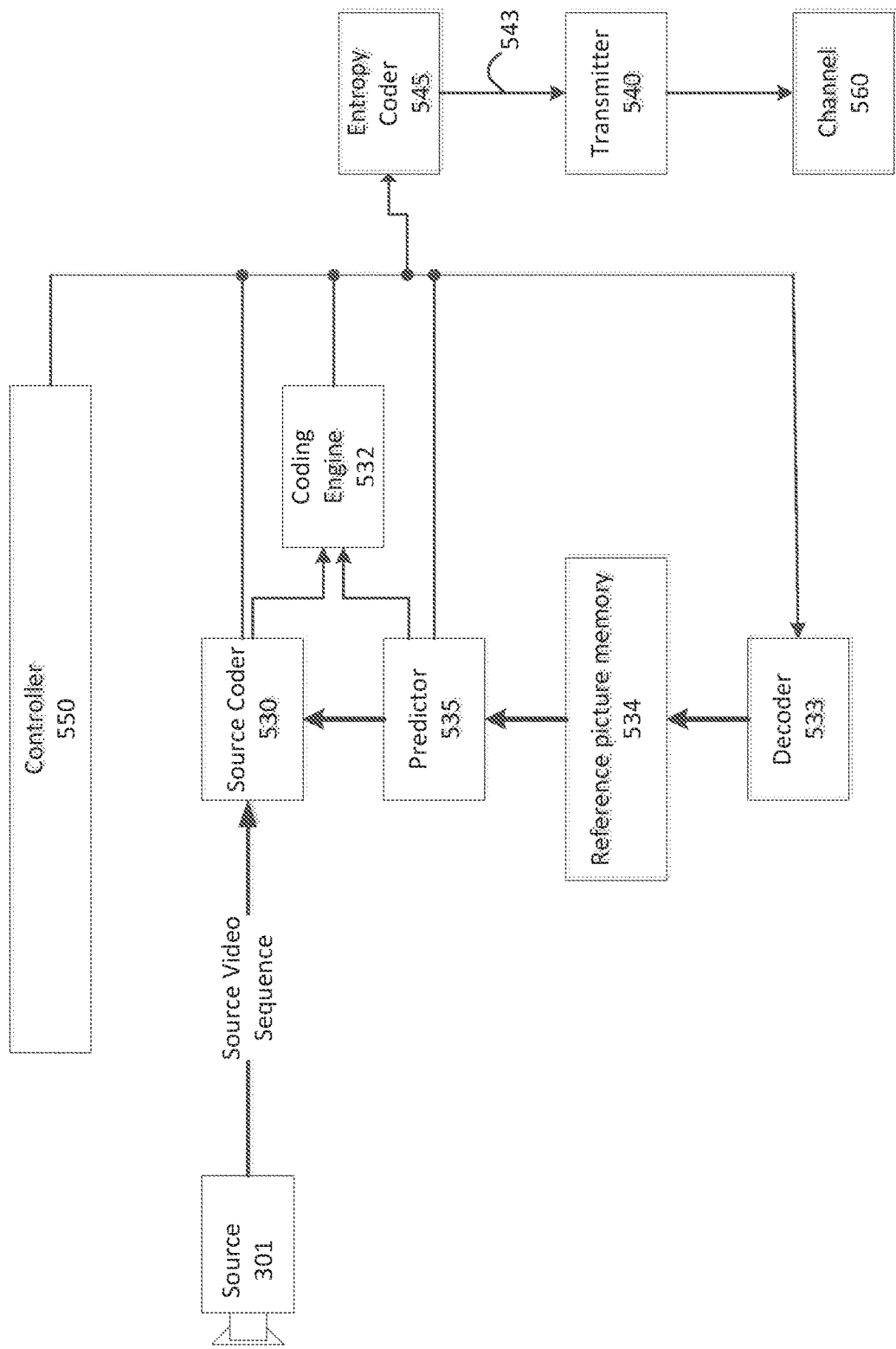
FIG. 5   Encoder 303

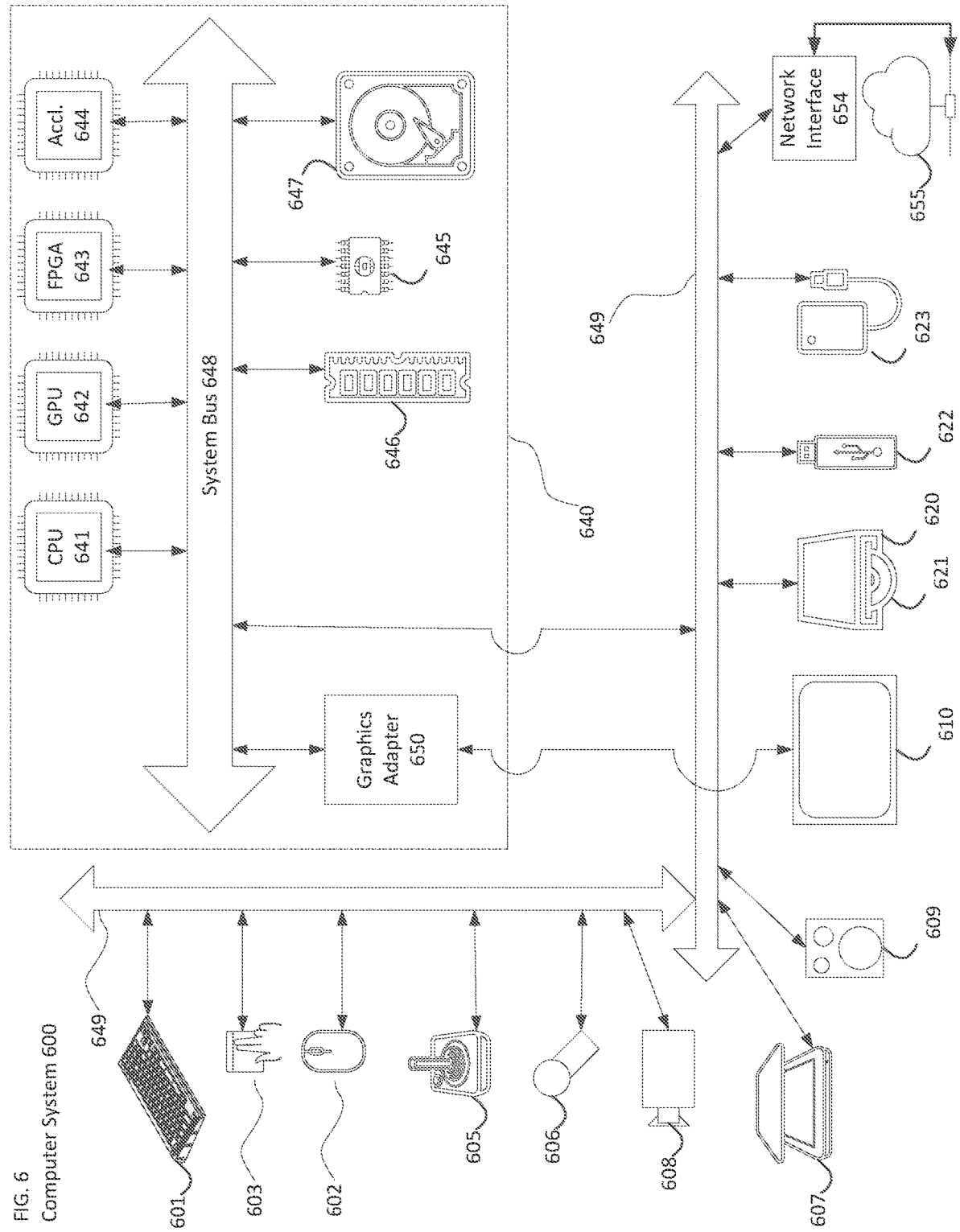

MAXIMUM TRANSFORM SIZE CONTROL

CROSS-REFERENCE TO RELATED APPLICATION

This application is a continuation of U.S. application Ser. No. 17/468,929, filed Sep. 8, 2021, which is a continuation of U.S. application Ser. No. 16/804,547, filed Feb. 28, 2020, issued as U.S. Pat. No. 11,159,795 on Oct. 26, 2021, which claims priority under 35 U.S.C. § 119 to U.S. Application No. 62/813,665, filed on Mar. 4, 2019, in the United States Patent & Trademark Office, which are incorporated herein by reference in their entireties.

FIELD

This disclosure is proposed for the next-generation video coding technologies beyond HEVC (High Efficiency Video Coding), e.g., Versatile Video Coding (VVC). More specifically, a scheme for controlling max transform size is proposed, in addition, the interaction between max transform size and transform partitioning schemes (e.g., sub-block transform (SBT) and Intra sub-partitioning (ISP)).

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology with a compression capability that significantly exceeds that of the HEVC standard (including its extensions). In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC). The current version of VTM (VVC Test Model), i.e., VTM 4.

SUMMARY

According to an aspect of the disclosure, a method for performing maximum transform size control for decoding of a video sequence includes identifying, by a decoder, a high-level syntax element associated with the video sequence; determining, by the decoder, a maximum transform size associated with the video sequence based on identifying the high-level syntax element associated with the video sequence; decoding, by the decoder, the video sequence using the maximum transform size based on determining the maximum transform size associated with the video sequence; and transmitting, by the decoder, the video sequence based on decoding the video sequence using the maximum transform size.

According to an aspect of the disclosure, a device for performing maximum transform size control for decoding of a video sequence includes at least one memory configured to store program code; at least one processor configured to read the program code and operate as instructed by the program code, the program code includes identifying code configured to cause the at least one processor to identify a high-level syntax element associated with the video sequence; determining code configured to cause the at least one processor to determine a maximum transform size associated with the video sequence based on identifying the high-level syntax element associated with the video sequence; decoding code configured to cause the at least one processor to decode the video sequence using the maximum transform size based on determining the maximum transform size associated with the video sequence; and transmitting code configured to cause the at least one processor to transmit the video sequence based on decoding the video sequence using the maximum transform size.

According to an aspect of the disclosure, a non-transitory computer-readable medium stores instructions, the instructions include one or more instructions that, when executed by one or more processors of a device for performing maximum transform size control for decoding of a video sequence, cause the one or more processors to identify a high-level syntax element associated with the video sequence; determine a maximum transform size associated with the video sequence based on identifying the high-level syntax element associated with the video sequence; decode the video sequence using the maximum transform size based on determining the maximum transform size associated with the video sequence; and transmit the video sequence based on decoding the video sequence using the maximum transform size.

BRIEF DESCRIPTION OF THE DRAWINGS

Further features, the nature, and various advantages of the disclosed subject matter will be more apparent from the following detailed description and the accompanying drawings in which:

FIG. 4 is a functional block diagram of a video decoder according to an embodiment of the present disclosure.

FIG. 5 is a functional block diagram of a video encoder according to an embodiment of the present disclosure.

FIG. 6 is a diagram of a computer system in accordance with an embodiment.

PROBLEM TO BE SOLVED

In the latest VVC draft, the maximum TU size is a fixed number of 64, which means there is no ability to perform control on the maximum TU size. However, there may be a requirement of controlling maximum TU size in VVC since maximum TU size has an impact on hardware complexity for encoder implementation (e.g., pipeline intermediate buffer size, number of multipliers etc.).

In the latest VVC draft, SBT and ISP have been included, and the interactions between SBT, ISP and maximum TU size need to be handled. For example, in SBT, a SPS flag sps_sbt_max_size_64_flag is signaled to indicate whether the largest SBT size is 32-length or 64-length, in case sps_sbt_max_size_64_flag is true and max TU size is 32-point, the current VVC draft cannot handle and an encoder crash may be triggered.

Currently, ISP mode is allowed for all CU sizes, however, when max transform size is set as smaller than 64, there is a conflict whether to perform implicit transform split, or explicit transform split using ISP with signaling. For example, when the max transform size is 16, for a 64×16 TU, without ISP, it should be implicitly split into four 16×16 TUs, however, with ISP, it may be partitioned using vertical ISP splitting, which results into same four 16×16 TUs, but using signaling.

DETAILED DESCRIPTION

In HEVC, a CTU is split into CUs by using a quadtree structure denoted as coding tree to adapt to various local characteristics. The decision on whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU.

Figure 1:
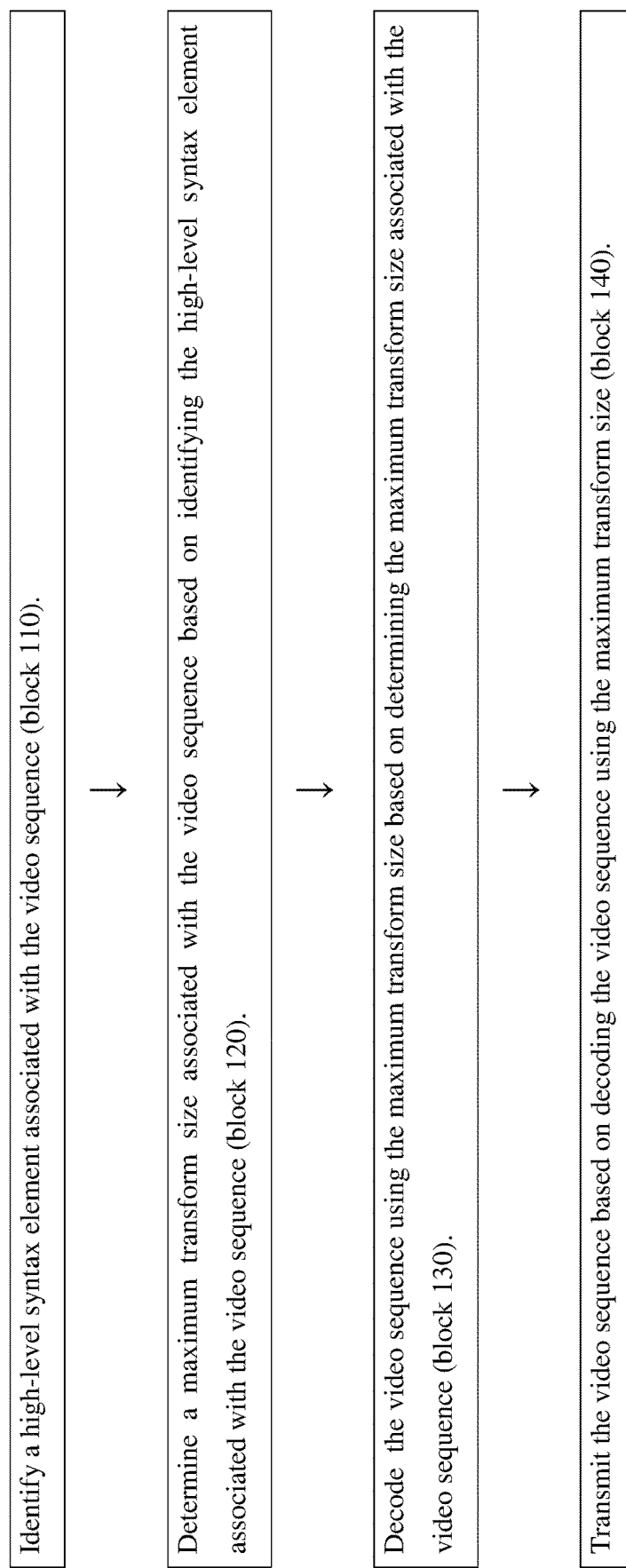
FIG. 1 is a flowchart of an example process for performing maximum transform size control for encoding or decoding of a video sequence.

The QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 1, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
 CTU size: the root node size of a quadtree, the same concept as in HEVC
 MinQTSize: the minimum allowed quadtree leaf node size
 MaxBTSize: the maximum allowed binary tree root node size
 MaxBTDepth: the maximum allowed binary tree depth
 MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

In block partitioning by using QTBT, a regarding splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the flexibility for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

A Multi-type-tree (MTT) structure is proposed. MTT is a more flexible tree structure than QTBT. In MTT, other than quad-tree and binary-tree, horizontal and vertical center-side triple-trees are introduced. The key benefits of the triple-tree partitioning are: complement to quad-tree and binary-tree partitioning: triple-tree partitioning is able to capture objects which locate in block center while quad-tree and binary-tree are always splitting along block center. The width and height of the partitions of the proposed triple trees are always power of 2 so that no additional transforms are needed.

The design of two-level tree is mainly motivated by complexity reduction. Theoretically, the complexity of traversing of a tree is $T^D$, where T denotes the number of split types, and D is the depth of tree.

In HEVC, the primary transforms are 4-point, 8-point, 16-point and 32-point DCT-2, and the transform core matrices are represented using 8-bit integers, i.e., 8-bit transform core. The transform core matrices of smaller DCT-2 are part of larger DCT-2.

The DCT-2 cores show symmetry/anti-symmetry characteristics, thus a so-called "partial butterfly" implementation is supported to reduce the number of operation counts (multiplications, adds/subs, shifts), and identical results of matrix multiplication can be obtained using partial butterfly.

In current VVC, besides 4-point, 8-point, 16-point and 32-point DCT-2 transforms which are same with HEVC, additional 2-point and 64-point DCT-2 are also included.

In addition to DCT-2 and 4×4 DST-7 which have been employed in HEVC, an Adaptive Multiple Transform (AMT, or as known as Enhanced Multiple Transform (EMT), or as known as Multiple Transform Selection (MTS)) scheme has been used in VVC for residual coding for both inter and intra coded blocks. It uses multiple selected transforms from the DCT/DST families other than the current transforms in HEVC. The newly introduced transform matrices are DST-7, DCT-8.

All the primary transform matrices in VVC are used with 8-bit representation. The AMT applies to the CUs with both width and height smaller than or equal to 32, and whether applying AMT or not is controlled by a flag called mts_flag. When the mts_flag is equal to 0, only DCT-2 is applied for coding the residue. When the mts_flag is equal to 1, an index mts_idx is further signalled using 2 bins to specify the horizontal and vertical transform to be used.

The Intra Sub-Partitions (ISP) coding mode divides luma intra-predicted blocks vertically or horizontally into 2 or 4 sub-partitions depending on the block size dimensions.

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

The ISP algorithm will only be tested with intra modes that are part of the MPM list. For this reason, if a block uses ISP, then the MPM flag will be inferred to be one. Besides, if ISP is used for a certain block, then the MPM list will be modified to exclude the DC mode and to prioritize horizontal intra modes for the ISP horizontal split and vertical intra modes for the vertical one.

In ISP, each sub-partition can be regarded as a sub-TU, since the transform and reconstruction is performed individually for each sub-partition.

|  | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       (tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     ...... | |
| } | |

In JVET-J0024, JVET-K139 and JVET-L0358, a spatially varying transform (SYT) scheme is proposed. With SYT, for inter prediction residuals, there is only residual block in the coding block, but the residual block is smaller than the coding block, therefore the transform size in SYT is smaller than the coding block size. For the region which is not covered by the residual block or transform, zero residual is assumed.

Using a proposed SBT on top of VYC is shown below, the added texts are highlighted in grey. It can be seen that the SBT methods requires additional overhead bits (cu_sbt_flag, cu_sbt_quad_flag, cu_sbt_horizontal_flag, cu_sbt_pos_flag) to be signaled to indicate the sub-block type (horizontal or vertical), size (half or quarter) and position (left or right, top or bottom).

|  | Descriptor |
|---|---|
| seq_parameter_set_rbsp( ) { |  |
|   sps_seq_parameter_set_id | ue(v) |
|   ... |  |
|   sps_mts_intra_enabled_flag | u(1) |
|   sps_mts_inter_enabled_flag | u(1) |
|   sps_sbt_enable_flag | u(1) |
|   rbsp_trailing_bits( ) |  |
| } |  |
| slice_header( ) { | Descriptor |
|   slice_pic_parameter_set_id | ue(v) |
|   slice_address | u(v) |
|   slice_type | ue(v) |
|   if ( slice_type != I ) { |  |
|     log2_diff_ctu_max_bt_size | ue(v) |
|     if( sps_sbtmvp_enabled_flag ) { |  |
|       sbt_mvp_size_override_flag | u(1) |
|       if( sbtmvp_size_override_flag ) |  |
|         log2_sbtmvp_active_size_minus2 | u(3) |
|     } |  |
|     if( sps_temporal_mvp_enabled_flag ) |  |
|       slice_temporal_mvp_enabled_flag | u(1) |
|     if( slice_type = = B ) |  |
|       mvd_l1_zero_flag | u(1) |
|     if( slice_temporal_mvp_enabled_flag ) { |  |
|       if( slice_type = = B ) |  |
|         collocated_from_l0_flag | u(1) |
|     } |  |
|     six_minus_max_num_merge_cand | ue(v) |
|     if( sps_sbt_enable_flag ) |  |
|       slice_max_sbt_size_64_flag | u(1) |
|     } |  |
|     if ( sps_alf_enabled_flag ) { |  |
|       slice_alf_enabled_flag | u(1) |
|       if( slice_alf_enabled_flag ) |  |
|         alf_data( ) |  |
|     } |  |
|   dep_quant_enabled_flag | u(1) |
|   if( !dep_quant_enabled_flag ) |  |
|     sign_data_hiding_enabled_flag | u(1) |
|   byte_alignment( ) |  |
| } |  |
| coding_unit( x0, y0, cbWidth, cbHeight, treeType ) { | Descriptor |
|   ... |  |
|   if( CuPredMode[ x0 ][ y0 ] != MODE_INTRA && cu_skip_flag[ x0 ][ y0 ] = = 0 ) |  |
|     cu_cbf | ae(v) |
|   if( cu_cbf ) { |  |
|     if( CuPredMode[ x0 ][ y0 ] != MODE_INTRA && sps_sbt_enable_flag ) { |  |
|       if( cbWidth <= maxSbtSize && cbHeight <= maxSbtSize ) { |  |
|         allowSbtVerHalf = cbWidth >= 8 |  |
|         allowSbtVerQuad = cbWidth >= 16 |  |
|         allowSbtHorHalf = cbHeight >= 8 |  |
|         allowSbtHorQuad = cbHeight >= 16 |  |
|         if( allowSbtVerHalf \|\| allowSbtHorHalf \|\| |  |
|           allowSbtVerQuad \|\| allowSbtHorQuad ) |  |
|           cu_sbt_flag[ x0 ][ y0 ] | ae(v) |
|       } |  |
|       if( cu_sbt_flag[ x0 ][ y0 ] ) { |  |
|         if( ( allowSbtVerHalf \|\| allowSbtHorHalf ) && |  |
|           ( allowSbtVerQuad \|\| allowSbtHorQuad ) ) |  |
|           cu_sbt_quad_flag[ x0 ][ y0 ] | ae(v) |
|         if( ( cu_sbt_quad_flag[ x0 ][ y0 ] && allowSbtVerQuad && allowSbtHorQuad ) |  |
|           \|\| ( !cu_sbt_quad_flag[ x0 ][ y0 ] && allowSbtVerHalf && allowSbtHorHalf ) ) |  |
|           cu_sbt_horizontal_flag[ x0 ][ y0 ] | ae(v) |

|  | Descriptor |
|---|---|
| ```
          cu_sbt_pos_flag[ x0 ][ y0 ]
       }
    }
    transform_tree( x0, y0, cbWidth, cbHeight, treeType )
  }
}
transform_tree( x0, y0, tbWidth, tbHeight, treeType) {
  if( tbWidth > MaxTbSizeY || tbHeight > MaxTb SizeY ) {
     trafoWidth = ( tbWidth > MaxTbSizeY ) ? (tbWidth / 2) : tbWidth
     trafoHeight = ( tbHeight > MaxTbSizeY ) ? (tbHeight / 2) : tbHeight
     transform_tree( x0, y0, trafoWidth, trafoHeight )
     if( tbWidth > MaxTbSizeY )
        transform_tree( x0 + trafoWidth, y0, trafoWidth, trafoHeight, treeType )
     if( tbHeight > MaxTbSizeY )
        transform_tree( x0, y0 + trafoHeight, trafoWidth, trafoHeight, treeType )
     if( tbWidth > MaxTbSizeY && tbHeight > MaxTbSizeY )
        transform_tree( x0 + trafoWidth, y0 + trafoHeight, trafoWidth, trafoHeight, treeType )
  } else if( cu_sbt_flag[ x0 ][ y0 ] )
     factorTb0 = cu_sbt_quad_flag[ x0 ][ y0 ] ? 1 : 2
     factorTb0 = cu_sbt_pos_flag[ x0 ][ y0 ] ? (4 − factorTb0 ) : factorTb0
     noResiTb0 = cu_sbt_pos_flag[ x0 ][ y0 ] ? 1 : 0
     if( !cu_sbt_horizontal_flag[ x0 ][ y0 ] ) {
        trafoWidth = tbWidth * factorTb0 / 4
        transform_tree( x0, y0, trafoWidth, tbHeight, treeType , noResiTb0 )
        transform_tree( x0 + trafoWidth, y0, tbWidth − trafoWidth, tbHeight, treeType ,
            !noResiTb0 )
     }
     else {
        trafoHeight = tbHeight * factorTb0 / 4
        transform_tree( x0, y0, tbWidth, trafoHeight, treeType , noResiTb0 )
        transform_tree( x0, y0 + trafoHeight, tbWidth, tbHeight − trafoHeight, treeType ,
            !noResiTb0 )
     }
  } else {
     transform_unit( x0, y0, tbWidth, tbHeight, treeType , 0 )
  }
}
``` | |
| ```
transform_unit( x0, y0, tbWidth, tbHeight, treeType , noResi ) {
  if( ( treeType = = SINGLE_TREE || treeType = = DUAL_TREE_LUMA ) &&
      !noResi )
``` | Descriptor |
| ```
     tu_cbf_luma[ x0 ][ y0 ]
``` | ae(v) |
| ```
  if( ( treeType = = SINGLE_TREE || treeType = = DUAL_TREE_CHROMA ) &&
      !noResi ) {
``` | |
| ```
     tu_cbf_cb[ x0 ][ y0 ]
``` | ae(v) |
| ```
     tu_cbf_cr[ x0 ][ y0 ]
``` | ae(v) |
| ```
  }
  if( ( ( ( CuPredMode x0 ][ y0 ] = = MODE_INTRA ) && sps_mts_intra_enabled_flag ) ||
      ( ( CuPredMode[ x0 ][ y0 ] = = MODE_INTER ) && sps_mts_inter_enabled_flag ) )
      && tu_cbf_luma[ x0 ][ y0 ] && treeType != DUAL_TREE_CHROMA
      && ( tbWidth <= 32 ) && ( tbHeight <= 32 ) && !cu_sbt_flag[ x0 ][ y0 ] )
``` | |
| ```
     cu_mts_flag[ x0 ][ y0 ]
``` | ae(v) |
| ```
  if( tu_cbf_luma[ x0 ][ y0 ] )
     residual_coding( x0, y0, log2( tbWidth ), log2( tbHeight ), 0 )
  if( tu_cbf_cb[ x0 ][ y0 ] )
     residual_coding( x0, y0, log2( tbWidth / 2 ), log2( tbHeight / 2 ), 1 )
  if( tu_cbf_cr[ x0 ][ y0 ] )
     residual_coding( x0, y0, log2( tbWidth / 2 ), log2( tbHeight / 2 ), 2 )
}
``` | |

"sps_sbt_enabled_flag" equal to 0 specifies that sub-block transform for inter-predicted CU is disabled. sps_sbt_enabled_flag equal to 1 specifies that sub-block transform for inter-predicted CU is enabled.

slice_sbt_max_size_64_flag equal to 0 specifies that the maximum CU width and height for allowing sub-block transform is 32. slice_sbt_max_size_64_flag equal to 1 specifies that the maximum CU width and height for allowing sub-block transform is 64.

maxSbtSize=slice_sbt_max_size_64_flag? 64:32 cu_sbt_flag[x0][y0] equal to 1 specifies that for the current coding unit, sub-block transform is used. cu_sbt_flag[x0][y0] equal to 0 specifies that for the current coding unit, the sub-block transform is not used.

When cu_sbt_flag[x0][y0] is not present, its value is inferred to be equal to 0.

When sub-block transform is used, a coding unit is tiled into two transform units, one transform unit has residual, the other does not have residual.

cu_sbt_quad_flag[x0][y0] equal to 1 specifies that for the current coding unit, the sub-block transform include a transform unit of ¼ size of the current coding unit. cu_sbt_quad_flag[x0][y0] equal to 0 specifies that for the current coding unit the sub-block transform include a transform unit of ½ size of the current coding unit.

When cu_sbt_quad_flag[x0][y0] is not present, its value is inferred to be equal to 0.

cu_sbt_horizontal_flag[x0][y0] equal to 1 specifies that the current coding unit is tiled into 2 transform units by a horizontal split. cu_sbt_horizontal_flag[x0][y0] equal to 0 specifies that the current coding unit is tiled into 2 transform units by a vertical split.

When cu_sbt_horizontal_flag[x0][y0] is not present, its value is derived as follows:

If cu_sbt_quad_flag[x0][y0] is equal to 1, cu_sbt_horizontal_flag[x0][y0] is set to be equal to allowSbtHoriQuad.

Otherwise (cu_sbt_quad_flag[x0][y0] is equal to 0), cu_sbt_horizontal_flag[x0][y0] is set to be equal to allowSbtHoriHalf.

cu_sbt_pos_flag[x0][y0] equal to 1 specifies that the tu_cbf_luma, tu_cbf_cb and tu_cbf_cr of the first transform unit in the current coding unit are not present in the bitstream. cu_sbt_pos_flag[x0][y0] equal to 0 specifies that the tu_cbf_luma, tu_cbf_cb and tu_cbf_cr of the second transform unit in the current coding unit are not present in the bitstream.

Inputs to this process are:

a luma location (xTbY, yTbY) specifying the top-left sample of the current luma transform block relative to the top-left luma sample of the current picture, transformed to e[x][y] with x=0 . . . nTbW−1, y=0 . . . nTbH−1 by invoking the one-dimensional transformation process for each column x=0 . . . nTbW−1 with the height of the transform block nTbH, the list d[x][y] with y=0 . . . nTbH−1 and the transform type variable trType set equal to trTypeVer as inputs, and the output is the list e[x][y] with y=0 . . . nTbH−1.

The intermediate sample values g[x][y] with x=0 . . . nTbW−1, y=0 . . . nTbH−1 are derived as follows:

$$g[x][y]=\text{Clip3}(\text{CoeffMin},\text{CoeffMax},(e[x][y]+256)>>9)$$

Each (horizontal) row of the resulting array g[x][y] with x=0 . . . nTbW−1, y=0 . . . nTbH−1 is transformed to r[x][y] with x=0 . . . nTbW−1, y=0 . . . nTbH−1 by invoking the one-dimensional transformation process for each row y=0 . . . nTbH−1 with the width of the transform block nTbW, the list g[x][y] with x=0 . . . nTbW−1 and the transform type variable trType set equal to trTypeHor as inputs, and the output is the list r[x][y] with x=0 . . . nTbW−1.

| | cu_sbt_horizontal_flag [ xTbY ][ yTbY ] == 0 | | cu_sbt_horizontal_flag [ xTbY ][ yTbY ] == 1 | |
|---|---|---|---|---|
| | cu_sbt_pos_flag [ xTbY ][ yTbY ] == 0 | cu_sbt_pos_flag [ xTbY ][ yTbY ] == 1 | cu_sbt_pos_flag [ xTbY ][ yTbY ] == 0 | cu_sbt_pos_flag [ xTbY ][ yTbY ] == 1 |
| trTypeHor | 2 | 1 | nTbW > 32 ? 0 : 1 | nTbW > 32 ? 0 : 1 |
| trTypeVer | nTbH > 32 ? 0 : 1 | nTbH > 32 ? 0 : 1 | 2 | 1 |

| | CuPredMode[ xTbY ][ yTbY ] == MODE_INTRA | | CuPredMode[ xTbY ][ xTbY ] == MODE_INTER | |
|---|---|---|---|---|
| mts_idx [ xTbY ][ yTbY ] | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 | a variable nTbW specifying the width of the current transform block, a variable nTbH specifying the height of the current transform block, a variable cIdx specifying the colour component of the current block, an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

If cu_sbt_flag[xTbY][yTbY] is equal to 1, the variable trTypeHor specifying the horizontal transform kernel and the variable trTypeVer specifying the vertical transform kernel are derived in Table 8-X depending on cu_sbt_horizontal_flag[xTbY][yTbY] and cu_sbt_pos_flag[xTbY][yTbY].

Otherwise (cu_sbt_flag[xTbY][yTbY] is equal to 0), the variable trTypeHor specifying the horizontal transform kernel and the variable trTypeVer specifying the vertical transform kernel are derived in Table 8-9 depending on mts_idx[xTbY][yTbY] and CuPredMode[xTbY][yTbY].

The (nTbW)×(nTbH) array r of residual samples is derived as follows:

Each (vertical) column of scaled transform coefficients d[x][y] with x=0 . . . nTbW−1, y=0 . . . nTbH−1 is There are different YUV formats. With the 4:2:0 format, LM prediction applies a six-tap interpolation filter to get the down-sampled luma sample corresponding to a chroma sample as shown in FIG. 6. In a formula way, a down-sampled luma sample Rec'L[x, y] is calculated from reconstructed luma samples as:

$$\text{Rec}'_L[x,y]=(2\times\text{Rec}_L[2x,2y]+2\times\text{Rec}_L[2x,2y+1]+\text{Rec}_L[2x-1,2y]+\text{Rec}_L[2x+1,2y]+\text{Rec}_L[2x-1,2y+1]+\text{Rec}_L[2x+1,2y+1]+4)>>3$$

FIG. 1 is a flowchart of an example process 100 for a method for performing maximum transform size control for encoding or decoding of a video sequence. In some implementations, one or more process blocks of FIG. 1 may be performed by a decoder. In some implementations, one or more process blocks of FIG. 1 may be performed by another device or a group of devices separate from or including a decoder, such as an encoder.

As shown in FIG. 1, process 100 may include identifying, by a decoder, a high-level syntax element associated with the video sequence (block 110).

As further shown in FIG. 1, process 100 may include determining, by the decoder, a maximum transform size associated with the video sequence based on identifying the high-level syntax element associated with the video sequence (block 120).

As further shown in FIG. 1, process 100 may include decoding, by the decoder, the video sequence using the maximum transform size based on determining the maximum transform size associated with the video sequence (block 130).

As further shown in FIG. 1, process 100 may include transmitting, by the decoder, the video sequence based on decoding the video sequence using the maximum transform size (block 140).

As used herein, a high-level syntax element may refer to any of Video Parameter Set (VPS), Sequence Parameter Set (SPS), Picture Parameter Set (PPS), Slice header, Tile header, Tile group header, or the like. Further, CTU (coding tree unit, which is the largest CU size) header may refer to syntax elements signaled for each CTU, e.g., as header information. Further still, "transform size" may refer to the maximum transform width and/height, or maximum transform unit area size.

According to an embodiment, a max transform size is signaled in high-level syntax elements or a CTU header. The minimum transform size is not signaled but set as a default value. Example values of minimum transform size include 4-length, 8-length and 16-length. In one embodiment, it is constrained that the max transform size must be a value among several predefined values. Examples of the predefined values include 16-length, 32-length, and 64-length.

In one embodiment, the log value of max transform size minus a constant is signaled. For example, the minimum supported max transform size is set as 16, the max transform size is signaled as log2_max_transform_size_minus_4, i.e., value 2 is signaled if max transform size is 64, and value 1 is signaled for max transform size 32. In another example, the minimum possible max transform size is set as 32, value 0 and 1 is signaled for max transform size 32 and 64, respectively.

According to an embodiment, only a max transform unit area size is signaled in high-level syntax elements or the CTU header. The minimum transform unit area size is not signaled but set as a default value, example values include 16 samples, 32 samples, 64 samples. In an embodiment, it is constrained that the max transform unit area size should be at least a default value. Examples of the default value include 64 samples, 128 samples, 256 samples, 512 samples, 1024 sample, 2048 samples or 4096 samples. In an embodiment, the log value of max transform unit area size divided by the minimum possible max transform unit area size is signaled. For example, the minimum possible max transform unit area size is set as 256, and the log value of max transform size divided by 256 is signaled, i.e., 0, 1, 2, 3, 4 is signaled if max transform unit area size is 256, 512, 1024, 2048 and 4096 respectively.

According to an embodiment, the maximum SBT size is constrained according to the signaled max transform size or transform unit size.

```
if( sps_sbt_enable_flag && sps_max_transform_size == 64 )
    slice_max_sbt_size_64_flag                                    u(1)
```

In one embodiment, the sps_sbt_max_size_64_flag is not signaled when max transform size is less than 64, but derived as a default value indicating max CU width and height for allowing SBT is 32 luma samples.

In another embodiment, the actual max CU width and height for allowing SBT is further adjusted by the high-level syntax elements indicating the max transform size, and the actual max CU width and height for allowing SBT is derived as the minimum value between max transform size and max CU width and height for allowing SBT signaled in high level syntax. For example, if the maximum transform size is 16, no matter slice_max_sbt_size_64_flag is signaled as 0 (max CU width and height for allowing SBT is 32) or as 1 (max CU width and height for allowing SBT is 64), the max CU width and height for allowing SBT is 16. The proposed changes on the VVC spec text is described below:

slice_sbt_max_size_64_flag equal to 0 specifies that the maximum CU width and height for allowing sub-block transform is 32. slice_sbt_max_size_64_flag equal to 1 specifies that the maximum CU width and height for allowing sub-block transform is 64.

maxSbtSize=min(max_transform_size, slice_sbt_max_size_64_flag? 64:32); where max_transform_size defines the maximum transform size.

It is proposed to apply SBT only when both the CU width and height are no larger than the max TU size.

Instead of indicating which transform unit has a non-zero coefficient, as done in SBT, it is proposed to first signal which sub-part (such as using SBT partition, i.e., left half, right half, top half, bottom half, left quarter, right quarter, top quarter or bottom quarter) of the coding unit has at least one non-zero coefficient, while each part of the coding unit may include one or multiple TUs.

In one embodiment, in case the sub-part size is larger than the max TU size, it is split into multiple TUs and each TU is no larger than the max TU size. For example, if the max TU size is 16-length and a 64×32 CU is determined to have only the right half (32×32) sub-part associated with non-zero coefficient, and the left half (32×32) sub-part is associated with only zero coefficient, in this case, the right half is further split into four 16×16 TUs and each 16×16 TU may have non-zero coefficient. A 64×32 CU includes only a right half (textured sub-part) associated with non-zero coefficients, and the right half 32×32 sub-part is further split into four 16×16 TUs.

In one embodiment, in case the sub-part size is larger than the max TU size, it is split into multiple TUs and each TU is no larger than the max TU size, and if all the TUs of the sub-part excluding the last TU in coding order are coded with a zero CBF, then the CBF of last TU of this sub-part is not signaled but derived with a non-zero CBF value.

According to an embodiment, instead of quarter partitioning used in SBT which partition the CU into 3:1 or 1:3 sub-parts, horizontally or vertically, it is proposed that, when CU width (W) is greater than height (H), then instead of 3:1 or 1:3 using vertical splitting, CU is partitioned into one left H×H and one right (W−H)×H, or one right H×H and one left (W−H)×H sub-parts. The proposed partitioning is different from the 3:1 and 1:3 partitioning when W is greater than 4*H. Similarly, when CU width (W) is smaller than height (H), then instead of 3:1 or 1:3 using horizontal splitting, CU is partitioned into one top H×H and one bottom (W−H)×H, or one bottom H×H and one top (W−H)×H sub-parts. The proposed partitioning is different from the 3:1 and 1:3 partitioning when H is greater than 4*W.

In one example, for a 128×16 CU, instead of partitioning into one 96×16 zero TU and one 32×16 nonzero TU, it is proposed to partition into one 112×16 zero and one 16×16 nonzero TU. In another example, for a 128×8 CU, instead of partitioning into one 96×8 zero TU and one 32×8 nonzero TU, it is proposed to partition into one 120×8 zero and one 8×8 nonzero TU.

In one embodiment, if the CU size is W×H, and with horizontal 1:3 or 3:1 partitioning, if 0.25 W is greater than the max TU size (max_transform_size), then instead splitting the CU into one 0.25W×H TU and one 0.75W×H TU, the CU is split into one max_transform_size×H TU and one (W−max_transform_size)×H TU.

In one example, for a 128×8 CU, if the max TU size is 16, instead of partitioning into one 96×8 zero TU and one 32×8 nonzero TU, it is proposed to partition into one 112×8 zero and one 16×8 nonzero TU.

In one embodiment, if the CU size is W×H, and with vertical 1:3 or 3:1 partitioning, if 0.25H is greater than the max TU size (max_transform_size), then instead splitting the CU into one W×0.25H TU and one W×0.75H TU, the CU is split into one max_transform_size×H TU and one (W−max_transform_size)×H TU.

Instead of signaling the max CU width and height for allowing SBT, as done by the high-level syntax slice_max_sbt_size_64_flag in current SBT design, the maximum transform size allowed for SBT is not signaled.

In one embodiment, even when the current CU width or height is larger than the maximum CU width and height for allowing SBT, as long as the resulting nonzero sub-TU has width and height being no larger than the maximum TU width and height, the SBT partitioning is allowed and can be signaled. For example, if the max TU size (width and height) is 32-point, and current CU is 64×32, then it is allowed to partition current CU vertically into two 32×32 TUs, or one nonzero 16×32 TU and one zero 48×32 TU, however, it is not allowed to split the current CU horizontally since the resulting transform width is 64 which is exceeding the maximum transform size.

The availability of SBT partitioning and direction may be based on whether the resulting non-zero sub-TU meets the constraint of maximum TU. If not available, the related flag is not signaled but inferred. In one example, a CU is 64×16 and maximum transform size is 16. In this case, half SBT split is not available so that cu_sbt_quad_flag is not signaled but inferred as true. Moreover, horizontally split SBT is also not available so that cu_sbt_horizontal_flag is not signaled but inferred as false.

It is proposed to disallow and not signal any SBT partitioning that results in a nonzero TU with height or width greater than the max TU size.

Currently, ISP mode is allowed for all CU sizes, however, when max transform size is set as smaller than 64, there is a conflict whether we do implicit transform split, or we do explicit transform split using ISP with signaling, to resolve this issue. It is proposed to constrain the maximum CU size for allowing ISP, such that when ISP is only applied for CUs without implicit transform split.

In one embodiment, the modified changes of the syntax table is described below.

| | |
|---|---|
| if (intra_luma_ref_idx[ x0 ][ y0 ] = = 0 && <br> ( cbWidth <= MaxTbSizeY ⊢ && cbHeight <= MaxTbSizeY ) && <br> ( cbWidth * cbHeight > MinTbSizeY * MinTbSizeY )) <br>    intra_subpartitions_mode_flag[ x0 ][ y0 ] | ae(v) |
| if( intra_subpartitions_mode_flag[ x0 ][ y0 ] = = 1 && <br> cbWidth <= MaxTbSizeY && cbHeight <= MaxTbSizeY ) <br>    intra_subpartitions_split_flag[ x0 ][ y0 ] | ae(v) |

When CU size is larger than the max TU size, after the CU being split into multiple TUs using implicit transform split, ISP may be further applied for each TU (size w×h) to indicate whether a TU is further split into multiple 0.5w×h, or w×0.5h, or 0.25w×h or w×0.25h smaller TUs.

In one example, if the CU size is 64×16, and largest TU size is 16, then the CU is first implicitly split as four 16×16 TUs, then for each 16×16 TU, ISP is applied to signal whether it is further split into four 4×16 or four 16×4 smaller TUs.

It is proposed to signal max transform size separately for different color components.

In one embodiment, one max transform size is signaled for luma component, and one max transform size is signaled for chroma components.

It is proposed to signal only the max transform size for one color component, and the max transform size applied for other color component is implicitly derived.

In one embodiment, one max transform size is signaled for a first component, for another component, according to the downsampling ratio in respect to the first component, the max horizontal transform and/or vertical transform size are adjusted accordingly.

In one example, if the samples of the current color component are downsampled by N versus the first color component in horizontal (and/or vertical) direction, i.e., the first color component has N times samples versus the current sample along the horizontal (and/or vertical direction) axis, then the max horizontal (and/or vertical) transform size applied for the current color component is the max transform size divided by N.

In one embodiment, one max transform size is signaled for luma component, if it is YUV 444 format, then the max transform size applied for chroma component is set as same as the max transform size applied for luma component.

In one embodiment, one max transform size is signaled for luma component, if it is YUV 422 format, then the max horizontal transform size applied for chroma component is set as half of the max transform size applied for luma component, and the max vertical transform size applied for chroma component is set as same as the max transform size applied for luma component.

It is proposed to apply different transform zero out scheme for different color components.

It is proposed to apply different transform zero out scheme for different color components only when the down sampling ratio among different color components is different.

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

Figure 2:
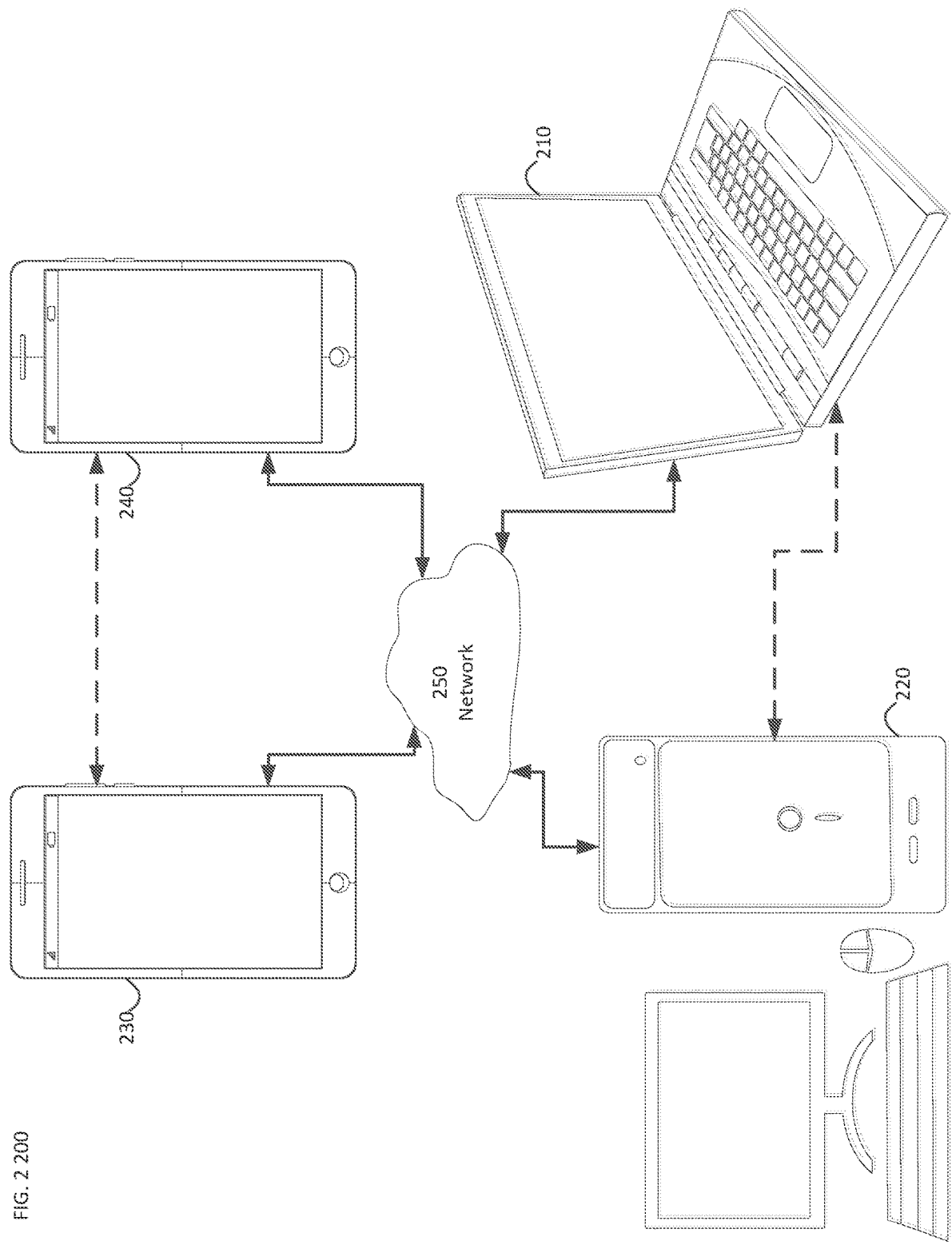
FIG. 2 is a simplified block diagram of a communication system according to an embodiment of the present disclosure.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
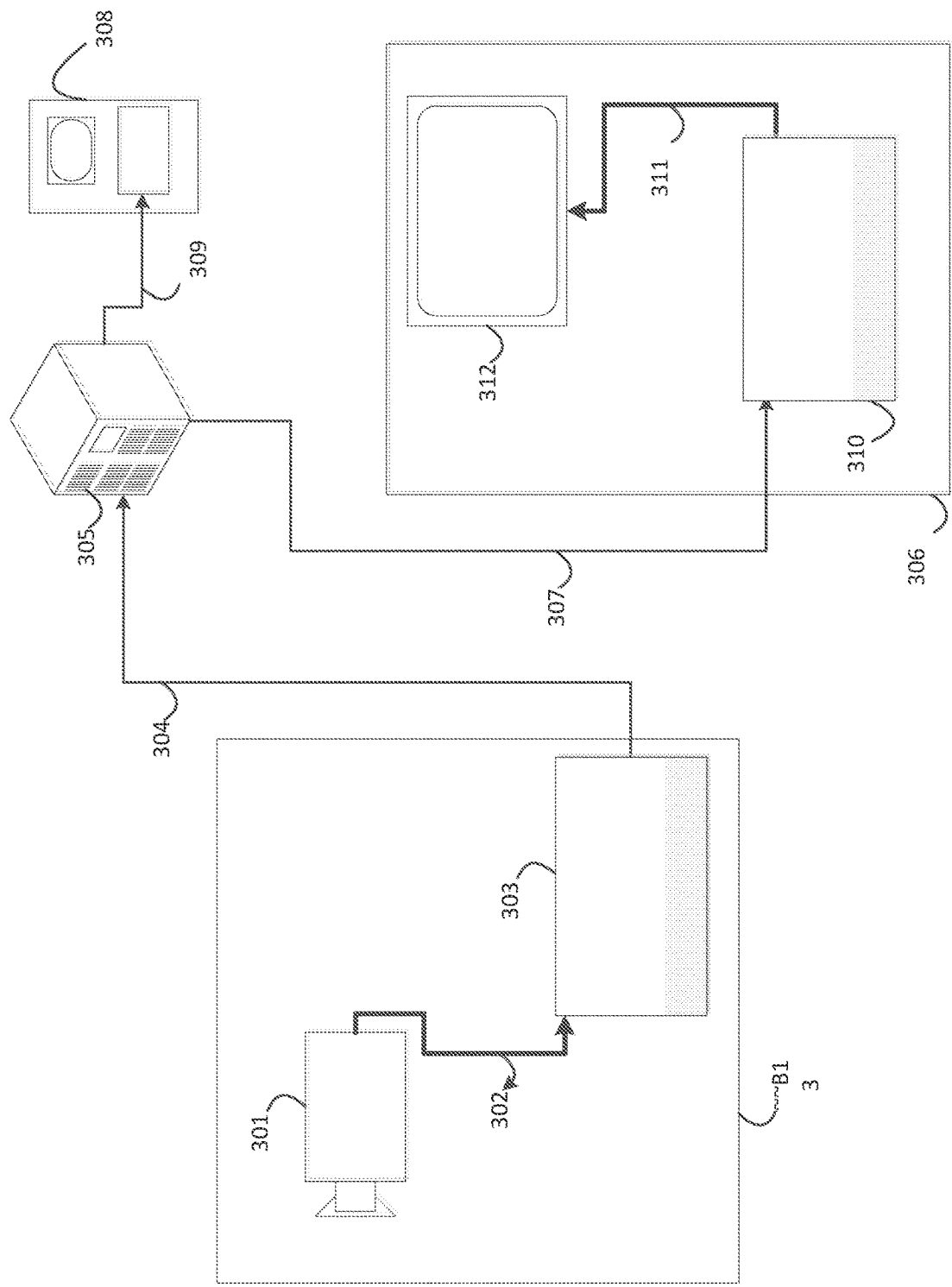
FIG. 3 is a diagram of the placement of a video encoder and decoder in a streaming environment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/ compression standards. Examples of those standards include ITU-T Recommendation H.265. Under development is a video coding standard informally known as Versatile Video Coding (VVC). The disclosed subject matter may be used in the context of VVC.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/ entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/ inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (454). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 1204, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 600; others are commonly integrated into the core of the computer system 600 by attachment to a system bus as described below (for example Ethernet interface into a PC computer system or cellular network interface into a smartphone computer system). Using any of these networks, computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms

HEVC: High Efficiency Video Coding
HDR: high dynamic range
SDR: standard dynamic range
VVC: Versatile Video Coding
JVET: Joint Video Exploration Team
MPM: most probable mode
WAIP: Wide-Angle Intra Prediction
CU: Coding Unit
PU: Prediction Unit
ISP: Intra Sub-Partitions
SBT: Sub-block transform
CBF: Coded block flag.

The invention claimed is:

1. A method for coding video data, executable by a processor, comprising:
   determining, by a decoder, a maximum transform size associated with the video sequence, wherein the maximum transform size is 32 or 64;
   determining, by the decoder, a value of a high-level syntax element for a video bitstream based on the determined maximum transform size, the high-level syntax element; and
   decoding, by the decoder, the high-level syntax element in the video sequence,
   wherein when a sub-block transform (SBT) mode is enabled, a maximum block size that allows the SBT mode is constrained by the maximum transform size, and
   wherein the maximum block size that allows the SBT mode is 32 when the high-level syntax element indicates that the maximum transform size is 32 or the maximum block size that allows the SBT mode is 64 when the high-level syntax element indicates that the maximum transform size is 64.

2. The method of claim 1, wherein the high-level syntax element is in one of a sequence parameter set (SPS), a video parameter set (VPS), and a picture parameter set (PPS).

3. The method of claim 1, wherein the high-level syntax element is one of a slice header, a tile header, tile group header, and a coding tree unit header.

4. The method of claim 1, wherein the maximum transform size corresponds to a maximum transform width and height.

5. The method of claim 1, wherein the maximum transform size corresponds to a maximum transform unit area.

6. The method of claim 1, wherein when intra sub-partitioning (ISP) mode is enabled, a maximum coding unit size is constrained by the maximum transform size.

7. The method of claim 6, wherein the ISP mode is only applied for coding units without implicit transform split.

8. A device for performing maximum transform size control for encoding of a video sequence, comprising:
   at least one memory configured to store program code;
   at least one processor configured to read the program code and operate as instructed by the program code, the program code including:

determining code configured to cause the at least one processor to determine a maximum transform size associated with the video sequence, wherein the maximum transform size is 32 or 64;

setting code configured to cause the at least one processor to set a value of a high-level syntax element in the video sequence based on the determined maximum transform size; and encoding code configured to cause the at least one processor to encode the high-level syntax element in the video sequence; and wherein when sub-block transform (SBT) mode is enabled, a maximum block size that allows the SBT mode is constrained by the maximum transform size, and wherein the maximum block size that allows the SBT mode is 32 when the high-level syntax element indicates that the maximum transform size is 32 or the maximum block size that allows the SBT mode is 64 when the high-level syntax element indicates that the maximum transform size is 64.

9. The device of claim 8, wherein the high-level syntax element is in one of a sequence parameter set (SPS), a video parameter set (VPS), and a picture parameter set (PPS).

10. The device of claim 8, wherein the high-level syntax element is one of a slice header, a tile header, a tile group header, and a coding tree unit (CTU) header.

11. The device of claim 8, wherein the maximum transform size corresponds to a maximum transform width and height or a maximum transform unit area.

12. The device of claim 8, wherein when intra sub-partitioning (ISP) mode is enabled, a maximum coding unit size is constrained by the maximum transform size.

13. The device of claim 12, wherein the ISP mode is only applied for coding units without implicit transform split.

14. A method of processing visual media data:

performing a conversion between a visual media file and a bitstream of a visual media data according to a format rule, wherein the bitstream indicates:

a maximum transform size associated with the video sequence, wherein the maximum transform size is 32 or 64;

a value of a high-level syntax element in the video sequence based on the determined maximum transform size, and a value of the high-level syntax element, wherein when sub-block transform (SBT) mode is enabled, a maximum block size that allows the SBT mode is constrained by the maximum transform size, and wherein the maximum block size that allows the SBT mode is 32 when the high-level syntax element indicates that the maximum transform size is 32 or the maximum block size that allows the SBT mode is 64 when the high-level syntax element indicates that the maximum transform size is 64.

* * * * *